T. ARNDT.
Cultivator.
No. 84,338.
Patented Nov. 24, 1868.
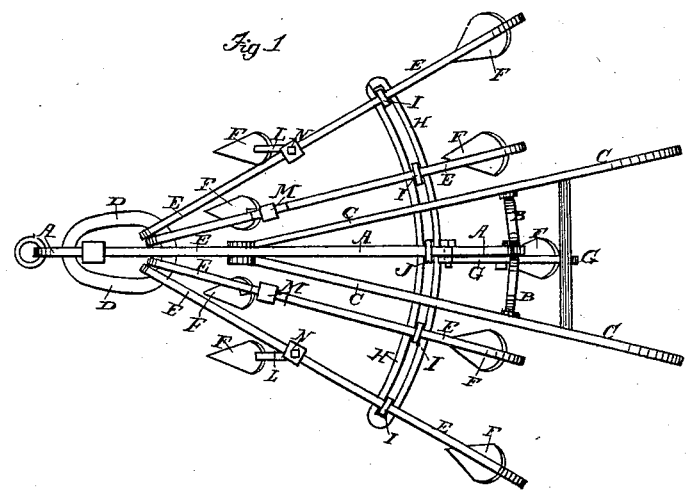
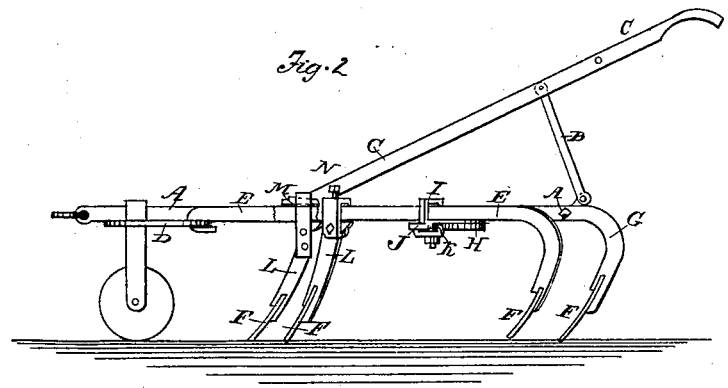
Witnesses.
Inventor

United States Patent Office.

THEOPHILUS ARNDT, OF MOUNT JOY, PENNSYLVANIA, ASSIGNOR TO HIMSELF AND E. L. FLOWERS, OF THE SAME PLACE.

Letters Patent No. 84,338, dated November 24, 1868.

IMPROVEMENT IN CULTIVATORS.

The Schedule referred to in these Letters Patent and making part of the same.

*To all whom it may concern:*

Be it known that I, THEOPHILUS ARNDT, of Mount Joy, in the county of Lancaster, and State of Pennsylvania, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a top or plan view of my improved cultivator.

Figure 2 is a side view of the same, part being broken away to show the construction.

Similar letters of reference indicate like parts.

My invention has for its object to furnish an improved cultivator, which shall be so constructed and arranged as to be conveniently and readily adjusted for performing the various operations necessary in cultivating corn in the various stages of its growth; and It consists in the construction and combination of various parts, as hereinafter more fully described.

A is the main or central beam of the cultivator, to the forward end of which the draught is attached.

To the rear end of the beam A are attached the lower ends of the braces B, the upper ends of which are attached to the handles C, to hold them in proper position.

The forward ends of the handles C are attached to the forward part of the beam A, as shown in the drawings.

D is a ring or ring-plate, attached to the forward part of the beam A, in a horizontal position, as shown in figs. 1 and 2, to receive the forward ends of the side beams E, the forward ends of which have hooks formed upon them, which hook into the ring D, as shown in the drawings.

The rear ends of the side beams E are bent or curved downward, and to their lower ends are attached the shovels or plows F.

To the rear end of the main or central beam A is detachably secured a curved piece or standard, G, having a shovel or plow, F, attached to its lower end, so that it may be conveniently removed when plowing or cultivating corn.

The rear parts of the beams A and E are adjustably connected and held in their proper relative positions by the curved and slotted or double bar H, bolts I, clips J, and nuts K.

The bolts I have slots formed in their upper ends, through which the beams A and E pass, so that the said bolts may be slid back and forth upon said beams in making the adjustments.

The bolts I pass through the slot of the curved bar H, through the clips J, and have nuts K screwed upon their lower ends, so as to clamp the said beams to the said curved bar H.

The clips J are made with projections upon the ends of their upper sides, which overlap the edges of the slotted bar H, to give additional firmness to the connection, and to guard against said bar's being spread by the strain upon it.

L are the forward standards, to the lower ends of which the plows or shovels F are attached.

The upper ends of the standards L are slotted, or have straps attached to them, through which the beams A and E pass, so that the said standards may be adjusted as the particular purpose for which the cultivator is to be used may require.

The standards L are secured in place, when adjusted, by wedges M, or by set-screws N, as may be desired, or convenient.

The standards L are formed with projections or knees upon the rear sides of their upper parts, which rest against the lower edges of the beams A and E, and strengthen the said standards against the draught-strain.

Having thus described my invention,

I claim as new, and desire to secure by Letters Patent—

1. The ring or ring-plate D, in combination with the central or main beam A of the cultivator, and with the hooked forward ends of the side or adjustable beams E, substantially as herein shown and described, and for the purpose set forth.

2. The combination of the curved and slotted bar H, slotted bolts I, clips J, and nuts K, with the central beam A, and with the adjustable side beams E, substantially as herein shown and described, and for the purpose set forth.

THEOPHILUS ARNDT.

Witnesses:
 ABRAM F. SHELLY,
 C. M. MARTIN,
 E. L. FLOWERS.